US008253883B2

(12) United States Patent
Mimura (10) Patent No.: US 8,253,883 B2
(45) Date of Patent: Aug. 28, 2012

(54) DISPLAY PANEL AND DISPLAY DEVICE (75) Inventor: Yasuhiro Mimura, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 681 days.

(21) Appl. No.: 12/295,746

(22) PCT Filed: Jan. 23, 2007

(86) PCT No.: PCT/JP2007/050974
§ 371 (c)(1),
(2), (4) Date: Oct. 2, 2008

(87) PCT Pub. No.: WO2007/132574
PCT Pub. Date: Nov. 22, 2007

(65) Prior Publication Data
US 2009/0115933 A1 May 7, 2009

(30) Foreign Application Priority Data

May 12, 2006 (JP) ................................. 2006-134193

(51) Int. Cl.
G02F 1/1333 (2006.01)
G02F 1/1343 (2006.01)
(52) U.S. Cl. ............................ 349/59; 349/110; 349/146
(58) Field of Classification Search .................... 349/59, 349/110, 146
See application file for complete search history.

(56) References Cited

U.S. PATENT DOCUMENTS

| 5,299,041 | A | * | 3/1994 | Morin et al. | 349/42 |
| 6,770,068 | B2 | * | 8/2004 | Ruiz et al. | 606/5 |
| 2002/0135713 | A1 | | 9/2002 | Kojima et al. | |
| 2003/0071941 | A1 | * | 4/2003 | Mizuno | 349/96 |
| 2003/0184693 | A1 | * | 10/2003 | Kadotani et al. | 349/110 |
| 2004/0004679 | A1 | * | 1/2004 | McKnight | 349/43 |
| 2004/0036979 | A1 | * | 2/2004 | Saitoh | 359/629 |
| 2005/0078267 | A1 | * | 4/2005 | Motomatsu | 349/190 |
| 2005/0200770 | A1 | * | 9/2005 | Kuo et al. | 349/58 |

FOREIGN PATENT DOCUMENTS

| EP | 1 235 197 A1 | 8/2002 |
| JP | 49-110668 U | 9/1974 |
| JP | 2000-075257 A | 3/2000 |
| JP | 2004-086099 A | 3/2004 |
| JP | 2005-195788 A | 7/2005 |

OTHER PUBLICATIONS

Official Communication issued in International Patent Application No. PCT/JP2007/050974, mailed on Mar. 20, 2007.

* cited by examiner

Primary Examiner — Jerry Blevins
(74) Attorney, Agent, or Firm — Keating & Bennett, LLP (57) ABSTRACT Each of a display panel and a display device includes a display region in which an image with uniform display quality is displayed and a curved line can be displayed in the contour. The display panel includes a shielding member and a plurality of pixels arrayed in a display region, wherein the shielding member includes a shielding curved portion having a curved planar shape, and the shielding curved portion shields the plurality of pixels to form a curved contour of the display region.

11 Claims, 6 Drawing Sheets

DISPLAY PANEL AND DISPLAY DEVICE

BACKGROUND OF THE INVENTION

1. Field of the Invention

The present invention relates to a display panel and a display device. More specifically, the present invention relates to a display panel and a display device, preferably used in a flat panel display such as an in-car instrumental panel, a car navigation system, a display device for amusement equipment.

2. Description of the Related Art

Flat panel displays (hereinafter, also referred to as a "FPD") which can be reduced in thickness or increased in size have been widely spread as a display device such as a TV and a display for personal computers. A liquid crystal display device, a plasma display device and the like may be mentioned as a FPD which has been practically used, currently.

According to a common liquid crystal display device, alignment of liquid crystals interposed between a pair of substrates is electrically controlled, and thereby an amount of light passing through the substrates from a backlight is adjusted (dimmed). In such a manner, the common liquid crystal display device displays an image. Such a liquid crystal display device is a slim profile and low-power display device. Further, such a liquid crystal display device has an advantage in that it can be applied to a display device having a screen in a variety of sizes from a small to medium size (42-inch model or so). Accordingly, the liquid crystal display device has been widely used in various applications such as a TV, a display for personal computers, a display for PDAs, a display for amusement equipment.

The plasma display device adopts the same light-emitting principle as in a fluorescent lamp. That is, according to a normal plasma display device, noble gas such as helium and neon is enclosed between the substrates on which electrodes are formed. A voltage is applied to the electrodes, and then the noble gas is converted into a plasma state. And when the gas in a plasma state (ion and electron) is recombined, UV ray is generated and a fluorescent substance formed on the substrate is irradiated with the UV ray. Such a PDP has characteristics such as a fast response speed, a high contrast ratio, a wide viewing angle, and easy upsizing, and it has been widely used as a large-sized TV.

An organic electroluminescent display device (hereinafter, also referred to as an "organic EL display device") and a field emission display device and the like may be mentioned as a FPD which has been actively researched and developed in order to be more widely used.

According to a common organic EL display deice, a light-emitting layer including an organic light-emitting material is formed between electrodes formed on substrates and a direct-current voltage is applied to this light-emitting layer. In such a manner, the common organic EL display device displays an image. Characteristically, such an organic EL display device can easily attain the following advantages: a reduction in power consumption, a reduction in film thickness, and colorization, and it has been expected to be applied to a display for PDAs.

The field emission display device adopts the same light-emitting principle as in a cathode-ray tube. That is, in a common field emission display device, a space between substrates on which electrodes are formed is maintained in a vacuum, and an electron is emitted from the electrodes toward a fluorescent substance arranged on the substrate, and thereby light is emitted. Characteristically, such a field emission display device can be reduced in thickness or increased in size, and has a power consumption lower than that in a cathode-ray tube. Such a field emission display device has been expected as a next-generation large-sized TV.

Figure 10A:
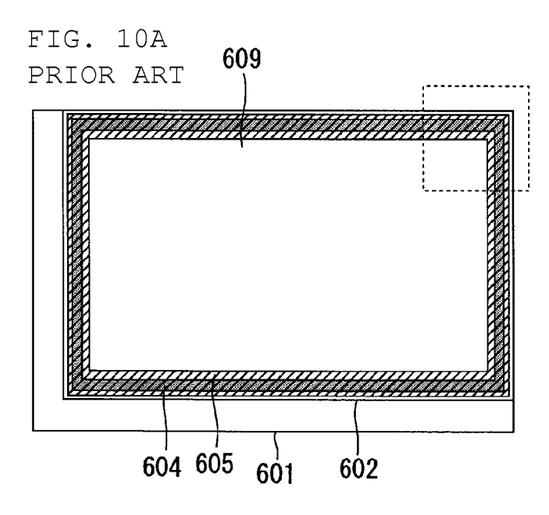
FIG. 10A is a schematic front view of a conventional display panel.
Figure 10B:
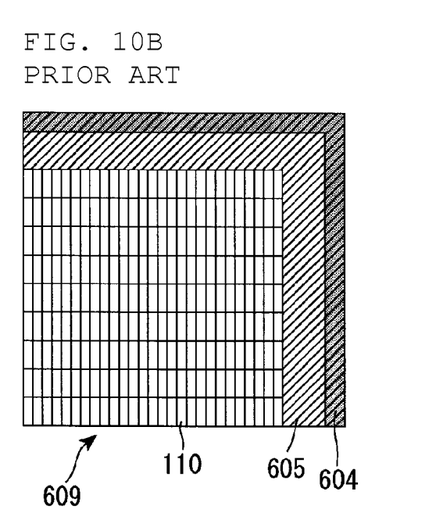
FIG. 10B is an enlarged schematic view of the region surrounded by the broken line in FIG. 10A.

Thus, the FPDs have various advantages depending on the kind, but they have almost the same shape (appearance). That is, the FPD generally has substantially rectangular display region and frame. For example, a publicly known liquid crystal display panel has a substantially rectangular planar shape, as shown in FIG. 10A. As shown in FIG. 10B, in a display region 109, pixels 110 are regularly arranged in a matrix pattern. The display region 109 also has a substantially rectangular contour. The liquid crystal display panel generally includes a thin film transistor array substrate 601, a color filter substrate 602, a sealing member 604 for sealing liquid crystals between the thin film transistor array substrate 601 and the color filter substrate 602, and a black mask 605.

For display devices used in applications such as an in-car instrumental panel, a display device for amusement equipment, and the like, diversification of a planar shape of a display region has been increasingly demanded recently, in view of improvement in design properties.

Under the above-mentioned circumstances, a method for producing a liquid crystal display panel having a variety of planar shapes such as an elliptical shape is disclosed (for example, refer to Japanese Kokai Publication No. 2000-75257 and Japanese Kokai Publication No. 2005-195788). Japanese Kokai Publication No. 2000-75257 discloses a technology of preparing a liquid crystal display panel having a desire planar shape using a panel substrate having a desired planar shape which is formed by selectively decomposing and removing a portion of the substrate.

Further, Japanese Kokai Publication No. 2005-195788 discloses a liquid crystal display panel having a circular arc outer shape, which includes a notched portion, and at both of the notched portion and the circular arc outer periphery of the panel, terminals for inputting a driving signal are arranged.

However, these documents hardly disclose a shape, an embodiment, and the like of components in the display region. Further, if pixels are arranged to correspond to the shape of the display panel disclosed in these documents, the pixels need to have a unique shape such as a sector shape and a trapezoid shape. Further, in the display region, the size of the pixels must be appropriately changed. Therefore, it becomes difficult to display an image with uniform display quality in the display region.

SUMMARY OF THE INVENTION

Preferred embodiments of the present invention provide a display panel and a display device, each of which includes a display region in which an image with uniform display quality is displayed and a curved line can be displayed in the contour.

The present inventors made various investigations of a display panel and a display device, each of which includes a display region in which an image with uniform display quality is displayed and a curved line can be displayed in the contour. The inventors noted an embodiment of a shielding member which specifies the contour of the display region. Then, the inventors discovered the following. The pixel in the display panel normally has a square (for example, rectangular) planar shape, conventionally. Even if pixels are arranged in such a way that the contour of the region where the pixels are arranged corresponds to the curved line, a rough image is displayed at this region. Further, the inventors found that the display region can be formed to have a curved contour without any limitation to the planar shape of the pixel in the following case: the display panel includes a shielding member which has a shielding curved portion having a curved planar shape, and a plurality of pixels formed in the display region are shielded by the shielding curved portion, and thereby the display region has a curved contour. As a result, the above-mentioned problems have been admirably solved, leading to completion of preferred embodiments of the present invention.

According to a preferred embodiment of the present invention, a display panel includes a shielding member and a plurality of pixels arrayed in a display region, wherein the shielding member includes a shielding curved portion having a curved planar shape, and the shielding curved portion shields the plurality of pixels to form a curved contour of the display region. As a result, a display panel in which an image with uniform display quality is displayed in the display region and a curved line can be displayed in the contour of the display region can be provided.

The display panel may or may not include other components as long as it essentially includes such components. The configuration of the display panel of the present invention is not especially limited.

In the present description, the display panel means an optical element including a member for electrically emitting light or electrically adjusting a light amount. The display panel normally includes a transparent insulating substrate. Further, terminals for supplying a signal for the respective pixels are arranged in the periphery of the display panel. For example, a liquid crystal display panel is an optical element including a liquid crystal layer, substrates including the liquid crystal layer therebetween, polarizers, and the like. The liquid crystal display panel electrically controls an amount of light the panel transmits or reflects. The display panel is not especially limited as long as it includes a display region where a plurality of pixels are arrayed. A liquid crystal display panel, a plasma display panel (hereinafter, also referred to as a "PDP"), an organic electroluminescent display panel (hereinafter, also referred to as an "organic EL display panel"), and a field emission display panel are preferable as the display panel according to a preferred embodiment of the present invention. Among these, a liquid crystal display panel is particularly preferable. A liquid crystal display panel in accordance with the display panel of a preferred embodiment of the present invention can be more preferably used in an in-car instrumental panel, a display device for amusement equipment, and the like.

It is preferable that the display panel includes a substrate including a substrate curved portion having a curved contour. According to this preferred embodiment, the planar shape of the display panel can be appropriately changed depending on the display region having a curved contour. A display device excellent in design property can be provided.

It is preferable that the plurality of pixels include pseudo curved pixels arranged in the pseudo curved pattern, and the shielding curved portion shields the pseudo curved pixels to form the curved contour of the display region. According to this preferred embodiment, the planar shape of the region where the pixels are arranged is appropriately changed depending on the planar shapes of the display region having a curved contour and the substrate. As a result, a display device more excellent in design property can be provided.

It is preferable that the shielding member overlaps with each of the pseudo curved pixels when the display panel is viewed in plane. According to this preferred embodiment, the display region can be formed to have a smoother curved contour. According to this preferred embodiment, the shielding member does not necessarily strictly overlap with every pseudo curved pixel.

It is preferable that the plurality of pixels have the same planar shape. According to this preferred embodiment, an image with more uniform display quality can be displayed in the display region. According to this preferred embodiment, the plurality of pixels does not necessarily have strictly the same planar shape. The plurality of pixels may have different planar shapes, as long as the difference is attributed to the production processes.

It is preferable that the display panel includes a pair of substrates each including a substrate curved portion having a curved contour; and a sealing member having a sealing curved portion having a curved planar shape. According to this preferred embodiment, liquid crystals, gases, and the like can be efficiently charged into a region corresponding to the display region having a curved contour between a pair of substrates, or a space between a pair of substrates can be efficiently maintained in vacuum. The sealing member is a member for sealing the pair of substrates. The sealing member is arranged on the outer circumferential side of the pixels. The sealing member is shielded by the shielding member. In a conventional display panel having a substantially rectangular planar shape, the shielding member is normally arranged along the contour of the region where the pixels are arranged and the sealing member. In contrast, in a preferred embodiment of the present invention, the shielding member is normally arranged along the contour of the region where the pixels are arranged, but may be arranged along the sealing member.

According to another preferred embodiment of the present invention, a display device includes the display panel according to other preferred embodiments of the present invention. According to this, a display device excellent in design property, which has a display region where a curved line can be displayed in the contour, can be produced.

The above-mentioned shielding member is not especially limited as long as it is a member for shielding light. A black mask, a shielding tape, and a bezel are preferable. Various preferred embodiments of the present invention can be easily realized if such a shielding member is used.

That is, it is preferable that the display panel includes a substrate, and the shielding member is a black mask formed on the substrate. The black mask is a shielding member arranged in the periphery of the display region.

It is preferable that the display panel includes a substrate and the shielding member is a shielding tape attached to the substrate.

It is preferable that the display device includes a backlight module behind the display panel, and the shielding member is a shielding tape attached to the display panel side of the backlight module.

It is preferable that the display device includes a bezel surrounding the display panel other than the display region, and the shielding member is the bezel.

Among these, a black mask is particularly preferable as the above-mentioned shielding member. If a black mask is used as the shielding member, the shielding member can be arranged closer to the light-emitting or light-dimming portion of the display panel. Therefore, light leakage generated near the shielding member can be effectively suppressed.

A plurality of members may be combined to be used as the above-mentioned shielding member. It is preferable that the shielding member specifies the contour of the display region from the viewpoint that the display panel and the display device according to a preferred embodiment of the present invention are easily realized.

In the present description, the display device means a display module produced by integrating circuits such as a driving circuit and a control circuit into the display panel. A transmissive liquid crystal display device normally includes a backlight module in addition to various circuits, for example.

In the present description, the backlight module means a device for illuminating the display panel provided inside the display device. The backlight module includes components such as a light source, a reflector, and an optical sheet.

According to various preferred embodiments of the present invention, a display panel and a display device, which are excellent in design property and which can display a smooth curved line in the contour of a display region, can be produced.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

The present invention is described in more detail below with reference to preferred embodiments with reference to the attached drawings, but is not limited in any way to only these preferred embodiments.

Preferred Embodiment 1

Preferred Embodiment 1 of the present invention is described with reference to FIGS. 1 to 3. According to the present preferred embodiment, a liquid crystal display panel is exemplified as the display panel and a liquid crystal display device is exemplified as the display device. However, the display panel and the display device of the present invention are not especially limited as long as they are flat panel displays. In addition to the liquid crystal display panel and the liquid crystal display device, a PDP, a plasma display device, an organic EL display panel, an organic EL display device, a field emission display panel, a field emission display device, and the like may be used.

Figure 1A:
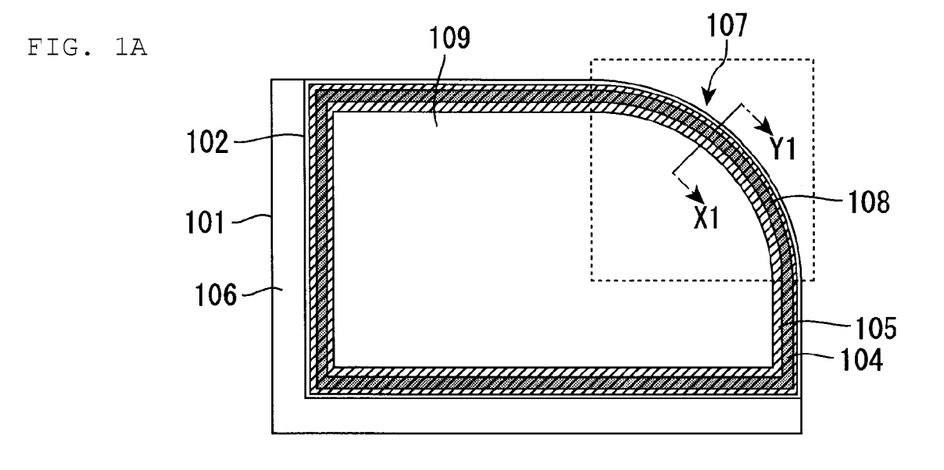
FIG. 1A is a schematic front view showing the display panel in accordance with Preferred Embodiment 1.

FIG. 1A is a schematic front view showing a display panel in accordance with the present preferred embodiment. FIG. 1B is a schematic cross-sectional view taken along line X1-Y1 in FIG. 1A. FIG. 1C is an enlarged planar view schematically showing a region surrounded by the broken line in FIG. 1A.

Figure 1B:
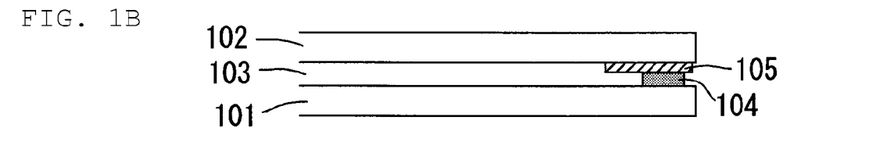
FIG. 1B is a schematic cross-sectional view taken along line X1 to Y1 in FIG. 1A.

As shown in FIGS. 1A and 1B, the display panel in accordance with the present preferred embodiment includes: the first substrate 101 and the second substrate 102 as a pair of substrates; a liquid crystal layer 103 interposed between the first substrate 101 and the second substrate 102; a sealing member 104 arranged between the first substrate 101 and the second substrate 102; and a shielding member 105 arranged along the contour of the second substrate 102.

With regard to the first substrate 101 and the second substrate 102, a thin film transistor (TFT) that is a switching element, a pixel electrode, a bus wiring, an alignment film, and the like are arranged on the liquid crystal layer 103 side of an insulating substrate, generally. As a result, pixels can control liquid crystals individually. Thus, the display panel of the present preferred embodiment preferably is an active matrix liquid crystal display panel. This display panel can display various images using the liquid crystals.

The material for the insulating substrate is not especially limited. A transparent glass, a transparent resin and the like may be mentioned.

The first substrate 101 is a so-called TFT array substrate. According to the first substrate 101, scanning signal lines and date signal lines which are bus lines are arranged in a matrix pattern to be intersect with each other with an insulating film therebetween. Further, at each intersection of the scanning signal lines and the date signal lines, a TFT is arranged and a pixel electrode is arranged in a region partitioned by the scanning signal lines and the data signal lines.

The second substrate 102 is a so-called color filter substrate (CF substrate). According to the second substrate 102, black matrixes are arranged in a lattice pattern at the boundary between the pixels. Further, in each region partitioned by the black matrixes, a color filter is arranged.

The display panel in accordance with the present preferred embodiment includes a pair of polarizers (not shown), which are arranged on the outer surfaces of the first substrate 101 and the second substrate 102, respectively. A retarder may be arranged between the polarizer and the first substrate 101, and between the polarizer and the second substrate 102.

The first substrate 101, that is, at least one of the pair of substrates, has a portion (protruding portion 106) which protrudes outside a region partitioned by the sealing member 104. A driver which is connected to the switching element in each pixel through the bus wiring is arranged in the protruding portion 106, which permits active driving of each pixel in the display panel in the present preferred embodiment. Thus, the protruding portion 106 is a portion (driving portion)

where the driver is arranged. It is preferable that the protruding portion is arranged in a region which is an extension of the bus wiring. It is more preferable that the protruding portion is arranged in a region which is an extension of the scanning signal line and the date signal line. As a result, the driver can be easily connected to the bus wiring.

The liquid crystal mode of the display panel in the present preferred embodiment is not especially limited. Examples thereof include TN (Twist Nematic) mode, IPS (In Plane Switching) mode, VATN (Vertical Alignment Twisted Nematic) mode, and VAECB (Vertical Alignment Electrically Controled Birefringence) mode. According to the display panel of the present preferred embodiment, each pixel is provided with alignment division.

The first substrate 101 and the second substrate 102 have the same contour in a region other than the protruding portion 106. Each of the first substrate 101 and the second substrate 102 has a substrate curved portion 107 having a circular or substantially circular arc contour at a corner not in contact with the protruding portion 106. As a result, the frame of the display device can be formed in a curved contour. The contours of the first and second substrates (the pair of substrates) are not especially limited, as mentioned below, in order to attain the advantages of the present invention, that is, in order to display an image with uniform display quality in the display region and form the display region in a curved contour. The contours of the first and second substrates (the pair of substrates) are not especially limited. However, if each of the first and second substrates has a substrate curved portion, the planar shape of the display panel can be appropriately changed depending on the display region having a curved contour. As a result, a display device excellent in design property can be produced.

Accordingly, the contours of the first substrate 101 and the second substrate 102 may be appropriately designed depending on a desired panel design, but it is preferable that the contour has a curved shape such as a semicircular shape and semi-elliptical shape, for example. Each of the first substrate 101 and the second substrate 102 has a contour having no angles, such as a circular or elliptical contour, in addition to the contour shown in FIG. 1A, that is, a rectangle, one corner of which is deformed into a circular arc shape.

In the present description, the contour is a shape of the outline of the display panel or the display device when the panel or device is viewed in front on the display side.

The sealing member 104 in the present preferred embodiment is a member for sealing the liquid crystal between the substrates. As shown in FIG. 1B, the sealing member 104 is arranged between the first substrate 101 and the second substrate 102. It is preferable that the sealing member 104 has a sealing curved portion 108 having a curved planar shape. As a result, liquid crystal can be efficiently charged into a region corresponding to the display region having a curved contour between the pair of substrates. The material for the sealing member 104 is not especially limited, and it may be appropriately selected.

In the present description, the planar shape is a shape of the display panel or the display device when the panel or the device is viewed in front on the display side.

The shielding member 105 is a member for shielding light. The region surrounded by the shielding member 105 is a display region 109 where a plurality of pixels are arranged. Thus, it is preferable that the contour of the display region 109 is specified by the shielding member 105. As a result, preferred embodiments of the present invention can be more easily obtained. In the display region 109, a plurality of pixels 110 having a substantially rectangular planar shape are arranged in a matrix pattern, as shown in FIG. 1C. Thus, if the pixels 110 have substantially the same planar shape, an image with uniform display quality can be displayed in the display region. The planar shape of the pixel 110 is not especially limited. The pixel 110 may have a substantially quadrate, substantially circular, substantially elliptical shape, for example. The arrangement of the pixels 110 is not limited to the stripe pattern shown in FIG. 1C. The pixels 110 may be arranged in a mosaic or delta pattern, for example.

The shielding member 105 is formed on the inner surface (on the liquid crystal layer side) of the second substrate 102 that is a CF substrate. Thus, it is preferable that the shielding member is a black mask arranged on the first substrate and/or the second substrate. It is more preferable that the shielding member is a black mask arranged on the inner surface of the first substrate and/or the second substrate. As a result, the shielding member is arranged closer to a light-emitting or light-dimming portion of the display panel, and therefore, parallax between the shielding member and the light-emitting or light-dimming portion when the display surface is observed can be reduced. Accordingly, light leakage generated near the light-shielding member can be effectively suppressed.

The material for the shielding member 105 is not especially limited. If the shielding member 105 is a black mask, it is preferable that the same material as that for the black matrix is used. As a result, the black matrix which specifies the boundary between the pixels can be integrally formed with the shielding member, which leads to simplification of the production processes. Accordingly, it is preferable that the shielding member 105 is arranged on the substrate where the black matrix is arranged (according to the present preferred embodiment, the second substrate that is a CF substrate), as shown in FIG. 1B. If the shielding member 105 is a black mask formed of the same material as that for the black matrix, the shielding member 105 is unified with a black matrix (not shown) in the region corresponding to the contour of the display region 109. In this case, a color filter which is arranged to correspond to a pseudo curved pixel 112 mentioned below is formed only in a region on the display region 109 side relative to the shielding member 105 of the pseudo curved pixel 112.

Figure 1C:
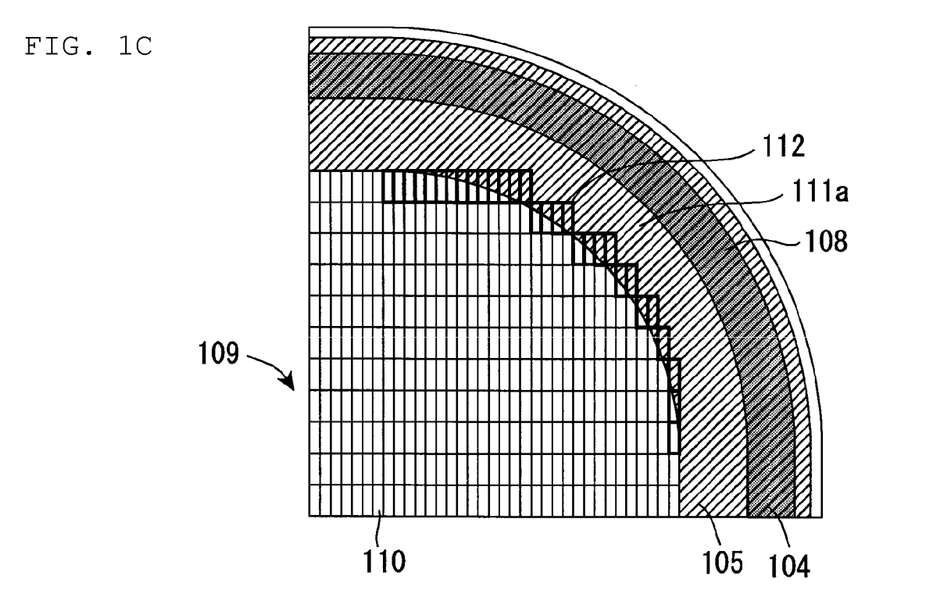
FIG. 1C is an enlarged schematic view of the region surrounded by the broken line in FIG. 1A.

The arrangement of the pixel and the light-shielding member near the substrate curved portion is mentioned with reference to FIG. 1C.

As shown in FIG. 1C, the shielding member 105 is arranged along the contours of the first substrate 101 and the second substrate 102. The shielding member 105 includes a shielding curved portion 111a having a curved planar shape. As a result, the display region 109 having a curved contour can be freely designed without any limitation to the planar shape of the pixel. Accordingly, a display panel which can display an image with uniform display quality in the display region and which can display a curved line in the contour of the display region can be realized.

Some of the pixels 110 are arranged in such a way that the display region does not have an angular shape near the shielding curved portion 111a. Thus, the pixels 110 include pseudo curved pixels 112 (in FIG. 1C, pixels surrounded by the thick line) arranged in a pseudo curved line along the shielding curved portion 111a. As a result, the planar shape of the region where the pixels are arranged can be appropriately changed depending on the planar shapes of the display region 109 having a curved contour, the first substrate 101, and the second substrate 102. Accordingly, a display device more excellent in design property can be realized.

Further, if almost all of the pseudo curved pixels 112 are arranged to overlap the shielding curved portion 111a when the display panel in the present preferred embodiment is viewed in plane. As a result, if a plurality of the pixels (pseudo curved pixels) are arranged along the shielding member not in a smooth curved shape, for example, in a substantially stepped shape, a portion of the pseudo curved pixel, which overlaps with the shielding curved portion having a smooth curved shape, is not recognized. Accordingly, a display panel which includes a display region having a very smooth curved shape can be realized, and such a display panel can display an image by driving the pixels arranged in a pseudo curved shape in a normal system.

In the present description, it is preferable that in the region corresponding to the shielding curved portion, the pseudo curved pixels 112 are pixels arranged in a substantially stepped shape in the outermost circumference of the display region, as shown in FIG. 1C. It is preferable that the pseudo curved pixels are driven together with other pixels arranged in the display region from the viewpoint that a curved line is displayed in the contour of the display region.

The planar shape of the shielding curved portion 111a is not especially limited it is a curved shape such as a semicircular shape or a semi-elliptical shape. The planar shape of the shielding curved portion 111a can be appropriately designed depending on a desired panel design. Accordingly, the planar shape of the shielding curved portion may be a shape having no corners such as a circular shape and an elliptical shape, in addition to a rectangular shape, one corner of which is deformed into a circular arc shape, as shown in FIG. 1A.

It is preferable in the display panel in accordance with the present preferred embodiment that dummy pixels (not shown) are further arranged in the outer circumference of the pixels arranged in the display region and such dummy pixels surround the region one round. The dummy pixel is a pixel which is arranged outside the display region, that is, at a position overlapping with the shielding member. Such a pixel is not recognized by an observer. Such a dummy pixel is driven and controlled by the bus wirings in the same manner as in the pixels (including the pseudo curved pixels) in the display region. As a result, the pixels arranged in the outermost circumference of the display region and those arranged at the center of the display region can have almost the same liquid crystal capacitance. Accordingly, uneven display generated in the contour of the display region can be suppressed. If no dummy pixels are arranged, the pixels arranged in the outermost circumference of the display region and those arranged at the center of the display region are differently influenced by an electrical field generated by the bus wirings and the like. As a result, the pixels arranged in the outermost circumference of the display region and those arranged at the center of the display region have different liquid crystal capacitances, which possibly causes uneven display in the contour of the display region.

Figure 2:
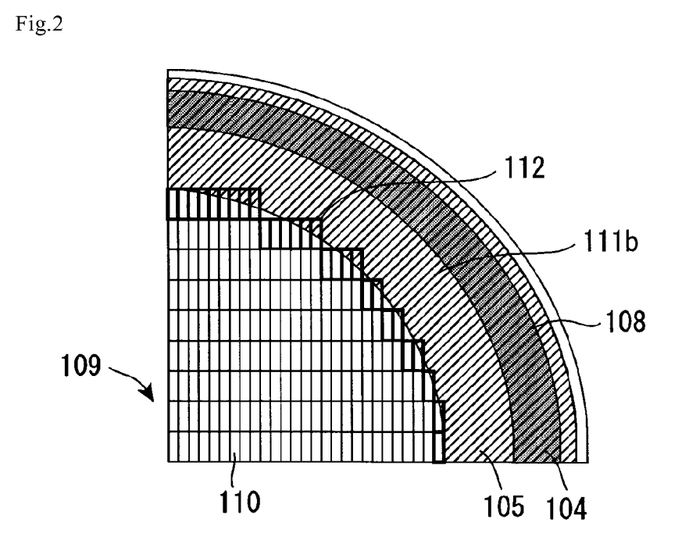
FIG. 2 is an enlarged front view schematically showing a region near the shielding curved portion in accordance with another arrangement of the display panel in Preferred Embodiment 1.

FIG. 2 is an enlarged front view schematically showing a region near the shielding curved portion in accordance with another arrangement of the display panel in accordance with the present preferred embodiment.

The display panel in the present preferred embodiment has a structure in which the shielding curved portion 111b does not completely overlap with each of the pseudo curved pixel 112, as shown in FIG. 2. According to this unique structure, the display region at the shielding curved portion 111b has a slightly irregular contour, but at least a portion of the contour of the display region can have a curved shape. The pixels are normally formed in a very high-definition. Therefore, even in this preferred embodiment, a display panel including a display region having a substantially curved contour can be provided.

A display device including the display panel in accordance with the present preferred embodiment is described below.

Figure 3A:
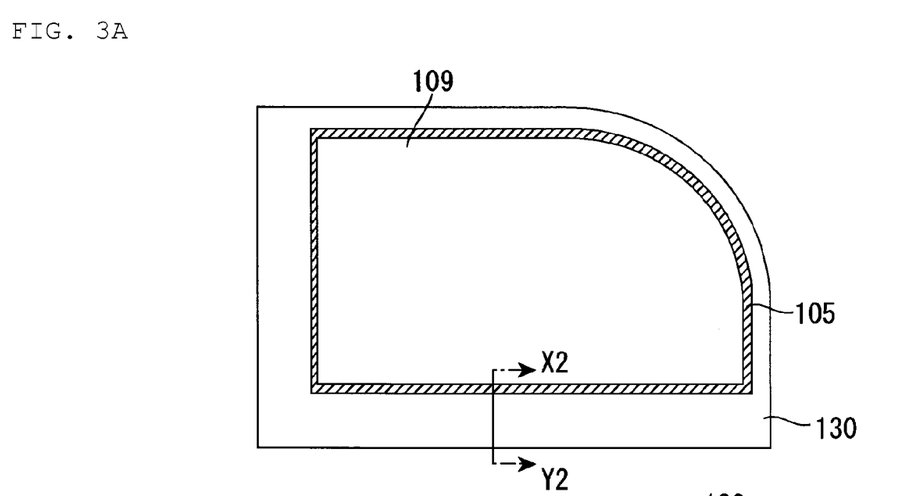
FIG. 3A is a schematic front view showing the display device in accordance with Preferred Embodiment 1.
Figure 3B:
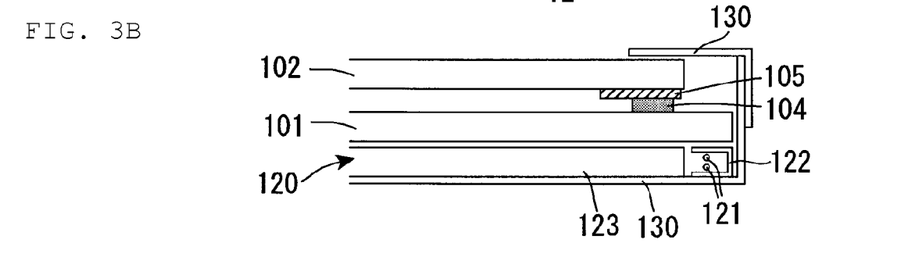
FIG. 3B is a schematic cross-sectional view taken along line X2 to Y2 in FIG. 3A.

FIG. 3A is a schematic front view showing a display device in accordance with the present preferred embodiment. FIG. 3B is a cross-sectional view taken along line X2-Y2 in FIG. 3A.

The display device in accordance with the present preferred embodiment includes a backlight module 120 arranged behind the display panel and a bezel 130 for holding the display panel and the back light module, in addition to the components constituting the display panel, such as the first substrate 101, the second substrate 102, the sealing member 104, and the shielding member 105.

The backlight module 120 is a so-called edge light type backlight. The backlight module 120 includes a light source 121, a reflector 122, a light guide plate 123, and optical sheets (not shown) arranged on the light guide plate. The light guide plate 123 has a planar shape corresponding to the display region of the display panel, that is, a shape having a curved portion. If the light guide plate having a curved portion is used, uniform light can be supplied to the display region of the display panel in the present preferred embodiment.

The backlight module 120 may be a direct type backlight. In such a case, a plurality of light sources may be appropriately arranged to correspond to the display region.

As mentioned above, if the display panel in accordance with the present preferred embodiment is used, a display device in which an image with uniform display quality can be displayed in the display region and a curved line can be displayed in the contour of the display region can be realized. Particularly, according to the present preferred embodiment, a display device having a rectangular or substantially rectangular plan shape, one corner of which is deformed into a circular or substantially circular arc shape, can be easily provided.

The production methods of the display panel and the display device in the present preferred embodiment are not especially limited. The display panel and the display device can be prepared by common steps for producing a liquid crystal panel and a liquid crystal display device.

The display panel in accordance with the present preferred embodiment is not especially limited as long as it includes a display region constituted by pixels arranged in a matrix pattern. Accordingly, the display panel of the present preferred embodiment can be applied to a passive matrix type liquid crystal display panel if it is used in a liquid crystal display panel.

Preferred Embodiment 2

Preferred Embodiment 2 of the present invention is described with reference to FIG. 4.

Figure 4:
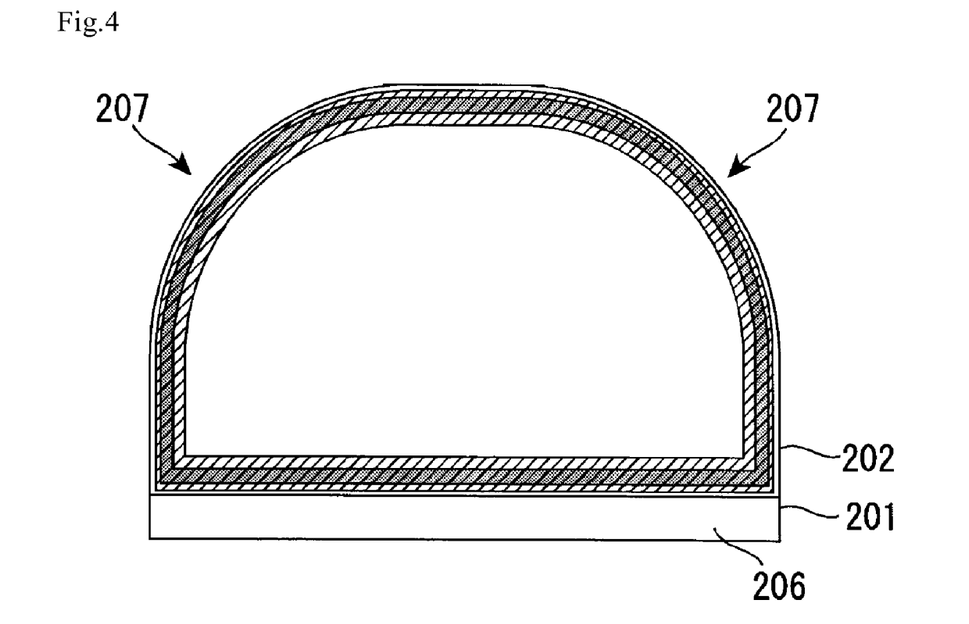
FIG. 4 is a schematic front view showing the display panel in accordance with Preferred Embodiment 2.

FIG. 4 is a schematic front view showing a display panel in accordance with preferred embodiment. The explanation for the same contents as in Preferred Embodiment 1 is omitted in Preferred Embodiment 2.

According to the present preferred embodiment, the first substrate 201 and the second substrate 202 (a pair of substrates) each have a plurality of substrate curved portions 207, as shown FIG. 4. The light-shielding member (in FIG. 4, a region shown by the upward-sloping line) includes a plurality of shielding curved portions along the substrate curved portions 207 of the first substrate 201 and the second substrate 202. Further, the pixels (not shown) include pseudo curved pixels in a plurality of regions along the plurality of shielding curved portions. As a result, the contours of the display region and the display device can be more freely designed.

In the present preferred embodiment, the first substrate 201 includes a protruding portion 206 only in a region adjacent to one side of the display region. Accordingly, from the viewpoint that the driver is surely connected to the bus wiring, the bus wiring which is an extension of which no driving element is provided, that is, the bus wiring arranged in substantially parallel to the protruding portion 206 when the substrate is viewed in plane (in FIG. 4, the wiring arranged in the lateral direction, and normally at least one of the scanning signal line and the data signal line) is extended to the protruding portion 206 along the shielding member not adjacent to the protruding portion 206.

Preferred Embodiment 3

The present invention is described with reference to Preferred Embodiment 3 of the present invention with reference to FIG. 5.

Figure 5:
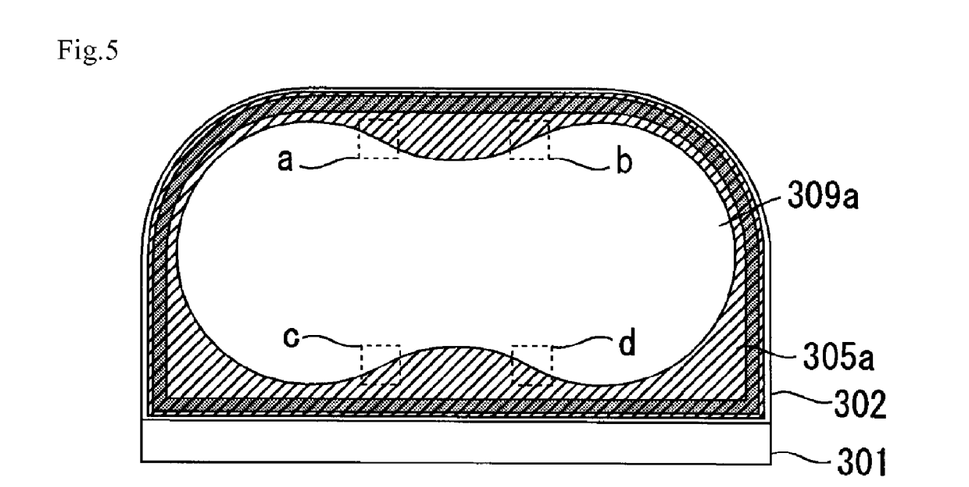
FIG. 5 is a schematic front view showing the display panel in accordance with Preferred Embodiment 3.
Figure 6A:
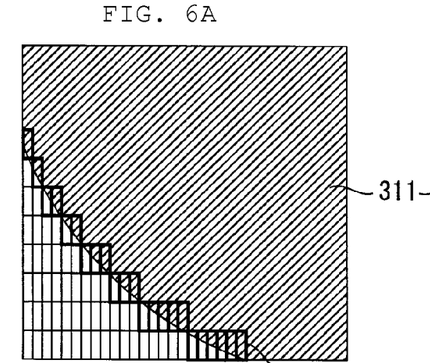
FIGS. 6A to 6D are enlarged schematic views showing regions a, b, c, and d surrounded by the broken line in FIG. 5.
Figure 6B:
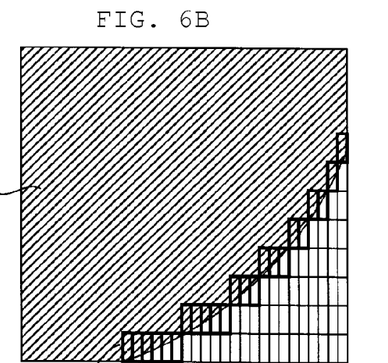
Figure 6C:
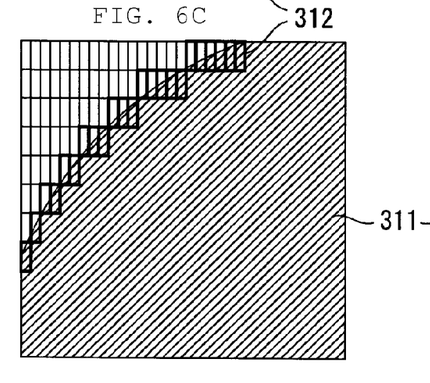
Figure 6D:
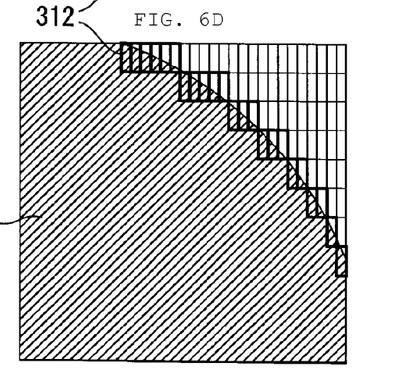

FIG. 5 is a schematic front view showing a display panel in accordance with the present Embodiment. FIGS. 6A to 6D are enlarged planar views showing the regions a, b, c, and d surrounded by the broken lines, in FIG. 5, respectively. The explanation for the same contents as in Preferred Embodiments 1 and 2 is omitted in Preferred Embodiment 3.

In the display panel according to a preferred embodiment of the present invention, the shielding member is not necessarily arranged along the contours of the substrates. Accordingly, the display panel of the present invention may have an embodiment in which a shielding member 305a is arranged not to correspond to the contours of the first substrate 301 and the second substrate 302 that are a pair of substrates, as shown in FIG. 5.

According to the shielding member 305a of the present preferred embodiment, shielding curved portions 311 are continuously arranged at the entire boundary between the shielding member 305a and the display region 309a. The pseudo curved pixels 312 are arranged to overlap with the entire region of the shielding curved portion 311, as shown in FIGS. 6A to 6D.

Thus, according to the present preferred embodiment, the display device and the display region can be individually designed to have desired contours. Therefore, a display device more excellent in design property can be produced.

The planar shape of the display region 309a is a shape formed of smoothly connected two circles. Accordingly, the present preferred embodiment can be preferably applied to an in-car instrumental panel in which two meters are arranged.

Figure 7A:
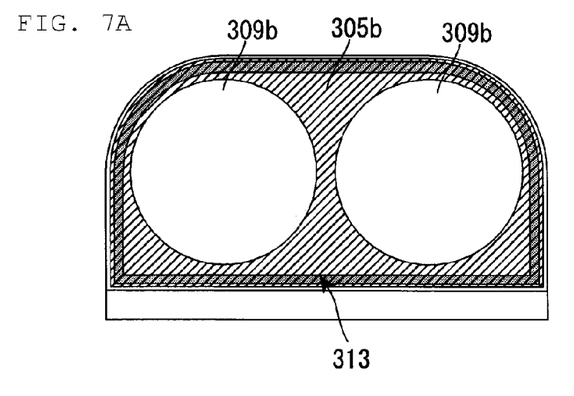
FIGS. 7A and 7B are enlarged front views schematically showing regions near the shielding curved portion in accordance with another arrangement of the display panel in Preferred Embodiment 3.
Figure 7B:
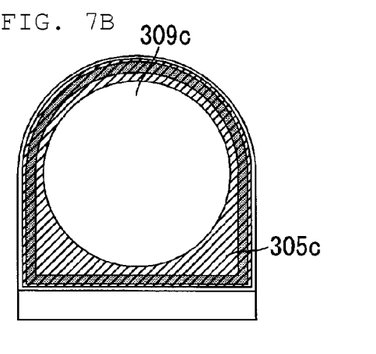

FIGS. 7A and 7B are enlarged front views each schematically showing a region near the shielding curved portion in accordance with another embodiment of the display panel in the present preferred embodiment.

According to the display panel of the present preferred embodiment, as shown in FIG. 7A, a light-shielding member 305b may be arranged to form a plurality of display regions 309b. Alternatively, as shown in FIG. 7B, a light-shielding member 305c may be arranged to form a display region 309c having an almost perfect circular planar shape. Such preferred embodiments also can be preferably applied to an in-car instrumental panel, and the like.

According to the display device of the present preferred embodiment, the sealing member may not be arranged to strictly correspond to the contours of the substrates. The position where the sealing member is arranged is not especially limited as long as it is in a region other than the display region. It is preferable that the sealing member is arranged to be farther away from the display region as much as possible from the viewpoint that uneven display generated at the end of the display region near the sealing member can be suppressed. It is preferable that the sealing member is arranged to be close to the display region as much as possible from the viewpoint that the use amount of the liquid crystal material is reduced.

An inlet into which liquid crystal is charged is normally provided for a portion of the sealing member. When the shielding member is arranged not to correspond to the contours of the substrates as in the present preferred embodiment, it is preferable that such an inlet is arranged in a region where the sealing member is farther away from the contour line on the display region side of the shielding member, that is, in a region that is farther away from the display region. More specifically, according to the present preferred embodiment, it is preferable that an inlet 313 is arranged at upper or lower center portion, a right lower portion, or a left lower portion of the sealing member in FIG. 4. According to this, adverse effects due to uneven display generated near the inlet can be suppressed.

Preferred Embodiment 4

Preferred Embodiment 4 is described with reference to FIGS. 8A and 8B.

Figure 8A:
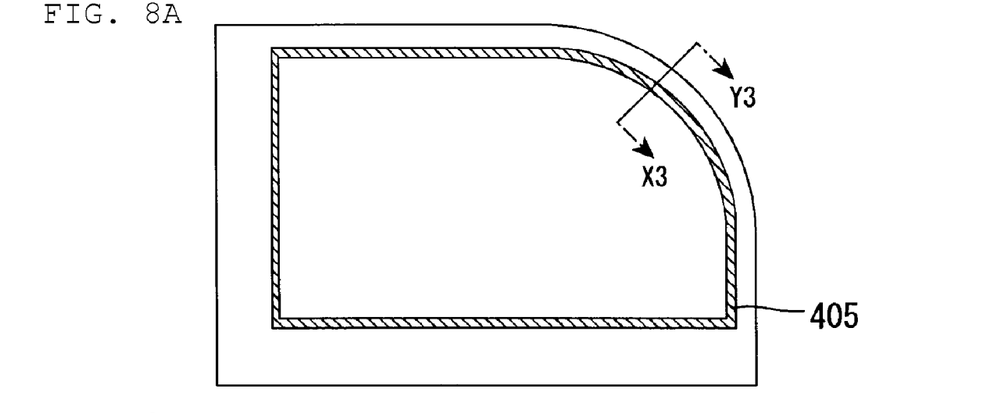
FIG. 8A is a schematic front view showing the display device in accordance with Preferred Embodiment 4.
Figure 8B:
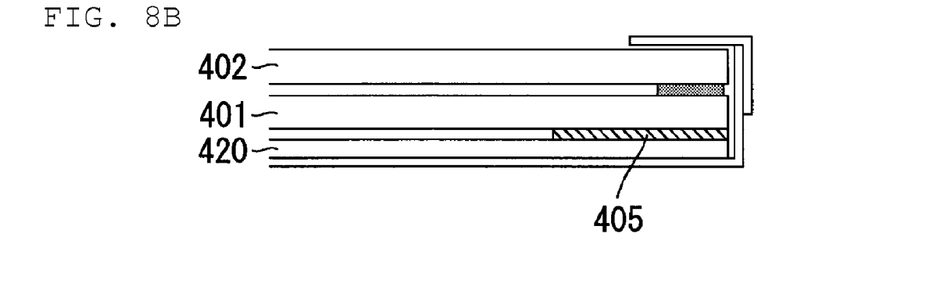
FIG. 8B is a schematic cross-sectional view taken along line X3-Y3 in FIG. 8A.

FIG. 8A is a schematic front view showing a display device in accordance with the present preferred embodiment. FIG. 8B is a schematic cross-sectional view taken along line X3-Y3 in FIG. 8A. The explanation for the same contents as in Preferred Embodiment 1 is omitted in Preferred Embodiment 4.

According to the present preferred embodiment, a shielding tape is arranged as the shielding member, in stead of the black mask. That is, the shielding member is a shielding tape attached to the substrate, according to the present preferred embodiment. More specifically, a shielding tape 405 as the shielding member is attached to the outer surface of the first substrate 401, as shown in FIGS. 8A and 8B. The shielding tape 405 specifies the contour of the display region. Preferred embodiments of other components such as arrangement of the pixels are the same as in Preferred Embodiment 1. According to this, also in the present preferred embodiment, a display panel and a display device, in which an image with uniform display quality is displayed in the display region and a curved line can be displayed in the contour of the display region, can be realized.

The shielding tape 405 may be attached to the outer surface of the second substrate 402, or may be attached to the display panel side of the backlight module 420.

The material for the shielding tape is not especially limited, and a shielding resin tape including a cohesive layer on at least one surface thereof may be used. The cohesive layer may be an adhesive layer.

Preferred Embodiment 5

Preferred Embodiment 5 of the present invention is described with reference to FIGS. 9A and 9B.

Figure 9A:
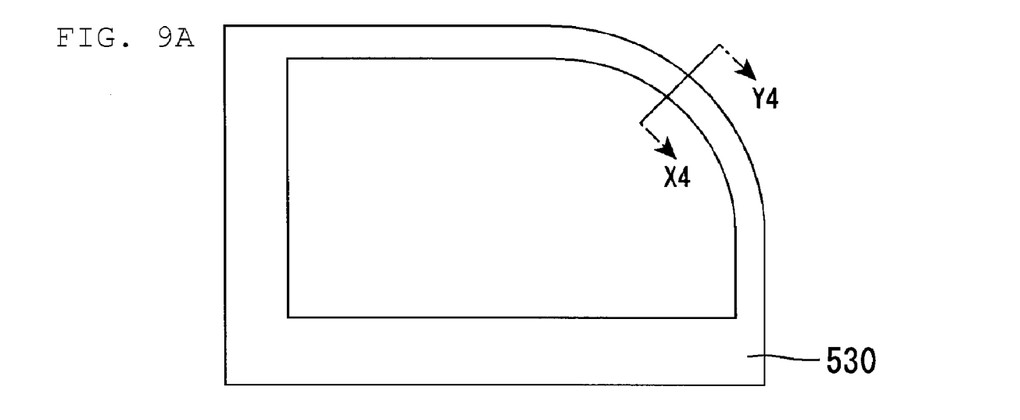
FIG. 9A is a schematic front view showing the display device in accordance with Preferred Embodiment 5.
Figure 9B:
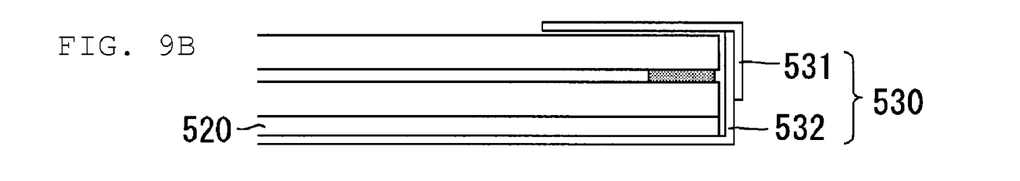
FIG. 9B is a schematic cross-sectional view taken along line X4 to Y4 in FIG. 9A.

FIG. 9A is a schematic front view showing a display device in the present preferred embodiment. FIG. 9B is a schematic cross-sectional view taken along line X4-Y4 in FIG. 9A. The explanation for the same contents as in Preferred Embodiment 1 is omitted in Preferred Embodiment 5.

According to the present preferred embodiment, a bezel is arranged as the shielding member, in stead of the black mask.

That is, according to the present preferred embodiment, the shielding member is a bezel which surrounds the display panel other than the display region. More specifically, as shown in FIGS. 9A and 9B, the bezel 530 holds a display panel and a backlight module 520 and it is arranged in the fringe region of the display device as the shielding member. The bezel 530 specifies the contour of the display region. Preferred embodiments of other components such as arrangement of the pixels are the same as in Preferred Embodiment 1. According to this, also in the present preferred embodiment, a display panel and a display device, in which an image with uniform display quality is displayed in the display region and a curved line can be displayed in the contour of the display region, can be realized. The bezel 530 is a member having a function of holding a display panel, a backlight module, a circuit board and the like.

The bezel 530 is generally constituted by a bezel arranged on the display surface side (a front bezel 531) and a bezel arranged on the back surface side (a rear bezel 532). Thus, it is preferable that the bezel which functions as the light-shielding member is a bezel (front bezel 531) arranged on the front surface side.

In Preferred Embodiments 1 to 5, the display panel and the display device of the present invention have been mentioned in detail above. The display panel and the display device of preferred embodiments of the present invention may be a PDP, a plasma display device, an organic EL display panel, an organic EL display device, a field emission display panel, a field emission display device, and the like, in addition to a liquid crystal display panel and a liquid crystal display device.

If the display panel and the display device according to various preferred embodiments of the present invention are applied to a PDP and a plasma display device, a plurality of pixels including pseudo curved pixels are formed and a shielding tape, a bezel and the like is arranged as a shielding member having a shielding curved portion, in a PDP and a plasma display device, which includes: a pair of substrates including electrodes, derivatives, fluorescent substances, partitions and the like; and noble gas interposed between the pair of substrates.

If the display panel and the display device according to various preferred embodiments of the present invention are applied to an organic EL display panel and an organic EL display device, a plurality of pixels including pseudo curved pixels are formed and a shielding tape, a bezel and the like is arranged as a shielding member having a shielding curved portion, in an organic EL display panel and an organic EL display device which includes a substrate on which an electrode, an organic thin film including a light-emitting material, and the like are formed.

Further, if the display panel and the display device of the various preferred embodiments of the present invention are applied to a field emission display panel and a field emission display device, a plurality of pixels including pseudo curved pixels are formed and a shielding tape, a bezel and the like is arranged as a shielding member having a shielding curved portion, in a field emission display panel and a field emission display device which include a microchip, a gate electrode, a fluorescent substance, and also a pair of substrates in which a space therebetween is maintained in vacuum.

The present application claims priority under the Paris Convention and the domestic law in the country to be entered into national phase on Patent Application No. 2006-134193 filed in Japan on May 12, 2006, the entire contents of which are hereby incorporated by reference.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display panel comprising:
   a shielding member;
   a substrate; and
   a plurality of pixels arrayed in a display region; wherein
   the shielding member includes a shielding curved portion having a curved planar shape;
   the substrate includes a substrate curved portion having a curved contour;
   the plurality of pixels include pixels that appear to be curved when viewed from a viewing direction of the display panel because portions of the pixels that appear to be curved are covered by the shielding curved portion, the pixels that appear to be curved being arranged to define a curved pattern extending along with the curved contour; and
   the shielding curved portion is arranged along the substrate curved portion.

2. The display panel according to claim 1, wherein the shielding member overlaps with each of the pixels that appear to be curved when the display panel is viewed in plane.

3. The display panel according to claim 1, wherein the plurality of pixels have the same planar shape.

4. The display panel according to claim 1, further comprising a second substrate including a second substrate curved portion having a curved contour, and a sealing member having a sealing curved portion having a curved planar shape.

5. The display panel according to claim 1, wherein the shielding member is a black mask of the display panel.

6. The display panel according to claim 1, wherein the shielding member is a shielding tape.

7. A display device comprising the display panel of claim 1.

8. The display panel according to claim 1, wherein the pixels that appear to be curved are arranged in a stepped shape along an outermost circumference of the display region in a region corresponding to the shielding curved portion in a plan view of the display panel.

9. A display device comprising:
   a display panel;
   a shielding member; and
   the display device includes a backlight module behind the display panel; wherein the display panel includes:
   a substrate; and
   a plurality of pixels arrayed in a display region;
   the shielding member includes a shielding curved portion having a curved planar shape;
   the substrate includes a substrate curved portion having a curved contour;
   the plurality of pixels include pixels that appear to be curved when viewed from a viewing direction of the display panel because portions of the pixels that appear to be curved are covered by the shielding curved portion, the pixels that appear to be curved being arranged to define a curved pattern extending along with the curved contour;
   the shielding curved portion is arranged along the substrate curved portion; and
   the shielding member is a shielding tape attached to a display panel side of the backlight module.

10. A display device comprising:
a display panel; and
a bezel; wherein
the display panel includes:
  a substrate; and
  a plurality of pixels arrayed in a display region;
the bezel includes a shielding curved portion having a curved planar shape;
the substrate includes a substrate curved portion having a curved contour;
the plurality of pixels include pixels that appear to be curved when viewed from a viewing direction of the display panel because portions of the pixels that appear to be curved are covered by the shielding curved portion, the pixels that appear to be curved being arranged in a curved pattern extending along with the curved contour;
the shielding curved portion is arranged along the substrate curved portion;
and
the bezel surrounds a region of the display panel other than the display region.

11. A display device comprising:
a shielding member;
a substrate;
a plurality of pixels; and
a display region in which the plurality of pixels are arranged; wherein
the shielding member includes a shielding curved portion having a curved planar shape;
the display region includes a curved contour when the substrate is viewed in a plan view;
the shielding member surrounds the display region and is arranged along the curved contour of the display region;
the plurality of pixels include outermost pixels arranged in a stepped shape along the curved contour of the display region when the substrate is viewed in the plan view; and
the shielding curved portion partially shields at least one of the plurality of pixels to define the curved contour of the display region.

* * * * *